Dec. 22, 1959    J. F. GALL ET AL    2,918,434
FLUORINATING COMPOSITION
Original Filed Sept. 10, 1948
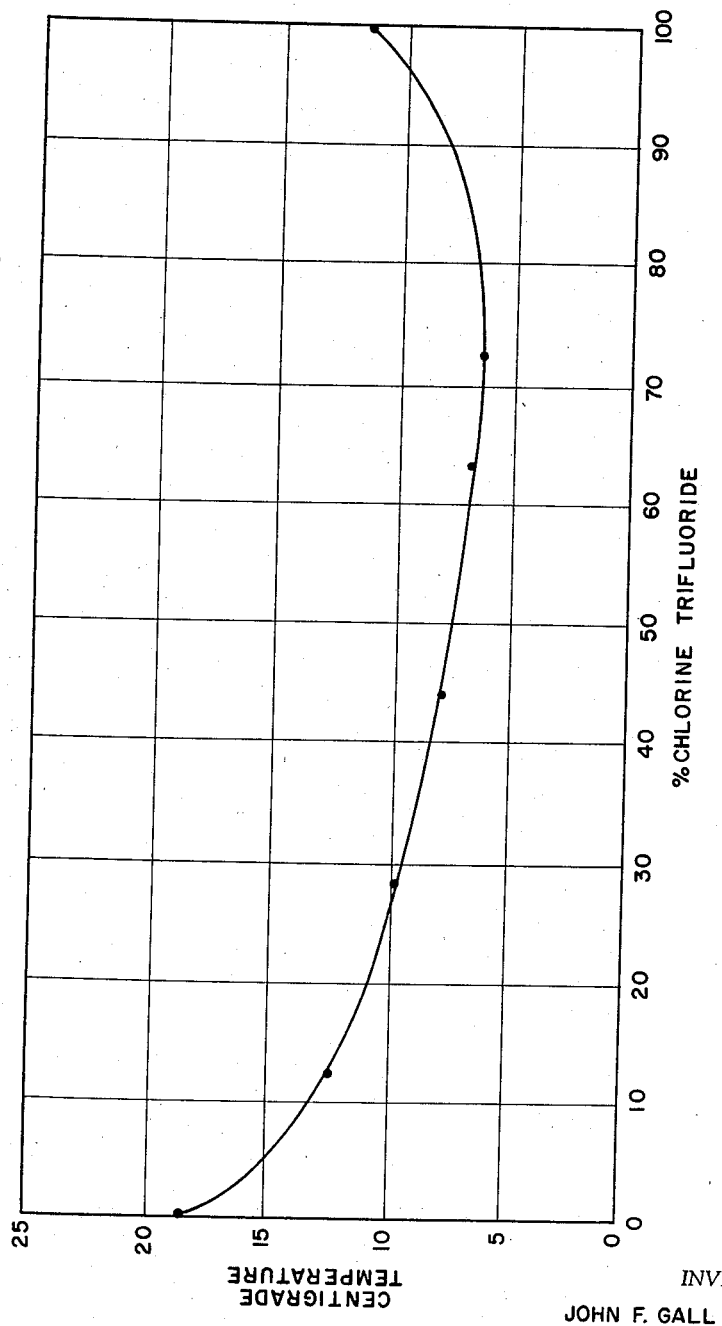
INVENTORS
JOHN F. GALL
CHARLES E. INMAN
BY *Arnold E. Lyden*
ATTORNEY

2,918,434
FLUORINATING COMPOSITION

John F. Gall, Narbeth, and Charles E. Inman, Roslyn, Pa., assignors to Pennsalt Chemicals Corporation, Philadelphia, Pa., a corporation of Pennsylvania Original application September 10, 1948, Serial No. 48,748, now Patent No. 2,702,306, dated February 15, 1955. Divided and this application May 19, 1953, Serial No. 363,771

6 Claims. (Cl. 252—182)

This invention relates to a new fluorinating agent for organic compounds, and to the production of organic fluorine compounds employing this agent. More specifically, the invention relates to mixed compositions comprising hydrogen fluoride and a halogen fluoride and to the use of such compositions for the direct introduction of fluorine into organic compounds through their reaction with the halogen fluoride in such composition.

It has heretofore been known that halogen fluorides can be reacted with organic compounds. Nutting et al., in Patent No. 1,961,622 refers to such a reaction between bromine trifluoride and carbon tetrachloride. All of the halogen fluorine compounds appear to react, with various degrees of violence, with organic compounds, the reactions being most violent with respect to the chlorine fluorine compounds, the most reactive being the higher fluorine derivative of chlorine, namely, chlorine trifluoride. A few workers in the field of fluorine compounds who had prepared the compound $ClF_3$ had observed that chlorine trifluoride reacted violently with organic substances. That, however, appears to have been the extent of any work done with respect to the fluorination of organic compounds by their reaction with chlorine trifluoride. Chlorine trifluoride has certain definite advantages over other known fluorinating agents, with the exception of elemental fluorine, in that it reacts more readily with organic compounds and has the highest percentage by weight of available fluorine. The only other comparable commercial fluorinating agents, within our knowledge, with respect to activity is elemental fluorine. Elemental fluorine, however, with a critical temperature of $-129°$ C., must be stored and shipped as a compressed gas under high pressure which is dangerous and costly since only a small proportional weight of the filled container is elemental fluorine. This necessitates its production, with all its accompanying problems, near the location where the elemental fluorine is to be used as a fluorinating agent. Furthermore, since elemental fluorine ordinarily is produced at pressure heads of less than $\frac{1}{10}$ pound per square inch, the fluorination reaction cannot be carried out at pressures in excess of this without entailing considerable difficulty in preventing back pressure on the fluorine cell.

Chlorine trifluoride, however, with a boiling point of $11°$ C. at atmospheric pressure, can be easily handled and transported as a liquid in suitable containers to the place of use and can, with relative convenience, be used in reactions carried out at super atmospheric pressures, thus making its availability and use considerably simpler than that of elemental fluorine. Most of the other halogen fluorides have even higher boiling points.

Despite the above properties of halogen fluorides, specifically chlorine trifluoride, which properties are much desired in a fluorinating agent, chlorine trifluoride has apparently never been used for this purpose except for the few experimental reactions run in determining its properties. The reason for this non-use is probably the violence of the reactions involved. This is best illustrated by reference to the literature which gives the observations of other workers. These observations have been substantiated by us.

H. R. Neumark (The Production of Fluorine and Chlorine Trifluoride—Combined Intelligence Objective Sub-Committee, Item 22, Misc. Chemicals—Office of Technical Services—PB-16838—August 20-22, 1945) makes the following statement concerning the reactions of chlorine trifluoride:

"With organic compounds ($ClF_3$) reacts violently even at temperatures as low as $-30°$ C. Certain compounds which contain nitro groups such as TNT, hexanitrodiphenyl and its amine, sulfide, sulfone or ether, as well as highly chlorinated compounds, can be dissolved in $ClF_3$ under certain circumstances. However these solutions are extremely sensitive against shock and especially the nitro compounds which sometimes detonate spontaneously at the slightest shock."

The work of Otto Ruff and H. Krug (Z. Anorg. Allgem. Chem. 190, 270-6 (1930)) also confirms this observation. H. S. Booth and J. T. Pinkston ("The Halogen Fluorides," Chemical Reviews 41, No. 3,421 (1947)) sum up the previous literature in regard to the reaction as follows:

"Organic compounds, even graphite and wood charcoal, react vigorously with chlorine trifluoride. Some of these reactions approach explosive violence. The behavior of benzene, ether, carbon tetrachloride, acetic acid, paraffin wax, cotton and wool, when brought in contact with chlorine trifluoride supports the generalization."

The advantages of and objections to chlorine trifluoride as a fluorinating agent apply also to the other halogen fluorine compounds, the applicability of such advantages and objections varying with the degree of violence with which the particular reaction results. Thus, for example, reactions between bromine pentafluoride and organic materials proceed with substantially the same objectionable violence as those between chlorine trifluoride and organic materials.

We have now discovered that hydrogen fluoride is completely miscible in all proportions with the various halogen fluoride compounds, the resulting mixture being completely homogeneous. Thus, for example, a completely homogeneous solution can be formed by adding to hydrogen fluoride one or more of the halogen fluorides, for example: chlorine trifluoride, chlorine monofluoride, bromine pentafluoride, bromine trifluoride, iodine heptafluoride and iodine pentafluoride. We have also discovered that if the $ClF_3$ or other halogen fluoride is dissolved in anhydrous hydrogen fluoride, the reaction of the $ClF_3$ or other halogen fluoride with organic compounds, though still rapid, can be controlled, the violence of the reactions between the halogen fluoride and organic compounds being considerably reduced. We have thus devised a method of carrying out controlled reactions between halogen fluorides and organic compounds, so as to bring about fluorination rather than, as where $ClF_3$ or $BrF_5$ are used, complete decomposition of the organic reactant as has heretofore been experienced. Since $ClF_3$ is one of the more reactive halogen fluorine compounds, the invention will be more particularly discussed with relation to $ClF_3$.

Fluorination reactions carried out with solutions of anhydrous hydrogen fluoride and $ClF_3$ show that the anhydrous hydrogen fluoride is a completely inert medium for the reaction. Also chlorine trifluoride is completely miscible in anhydrous hydrogen fluoride in all proportions, the boiling points of mixtures of these two substances lying between $6°$ and $20°$ C. as illustrated in the accompanying drawing. This is a convenient range for carrying out chemical fluorination processes. Because of the moderate boiling point of anhydrous hydrogen fluoride (19.4° C.) and the nearness of the boiling point of $ClF_3$ (11.3° C.), it is possible to carry out the reactions either in the liquid or the vapor phase, the hydrogen fluoride acting in each case to modify the normally violent reaction of the $ClF_3$ with the organic substances so as to give a controlled fluorination reaction.

In our experimented work we have noted that those substances referred to in the literature, some of them having already been mentioned, as reacting violently with chlorine trifluoride when reacted with our new fluorinating composition comprising chlorine trifluoride and hydrogen fluoride, continued to react rapidly but without the explosive violence noticed when chlorine trifluoride was used alone. It was further noted that the rate of the reaction could be varied by varying the amounts of the relative ingredients of the chlorine trifluoride-hydrogen fluoride composition.

In practical application the invention may be subjected to numerous modifications and variations, particularly as regards the nature and proportion of reactants, the proportion of chlorine trifluoride to anhydrous hydrogen fluoride, the temperature, the pressure and the exact method of procedure. While it would be impossible, as a practical matter, to give illustrative examples of all the various methods of practicing the invention, the following examples, in which the parts are given by weight, will serve to illustrate the flexibility of the invention and some ways in which it may be practiced.

*Example I*

In a copper reaction flask, fitted with a high speed stirrer and a Dry Ice condenser, 522 grams (2 mols) of hexachlorobutadiene were suspended in an equal weight of anhydrous hydrogen fluoride liquid by means of the stirrer. The reactor was cooled by means of a surrounding Dry Ice bath. From a weighed cylinder containing in the liquid phase a 21.4% solution of $ClF_3$ in anhydrous hydrogen fluoride, the fluorinating agent was run slowly into the suspension of organic. The temperatures in the reaction zone were maintained between 18–20° C. After the equivalent of two mols of $ClF_3$ had been added, there was a noticeable decrease in the evolution of heat from the reaction. The addition of the fluorinating agent was discontinued and the mixture was allowed to stand for forty-five minutes. The resulting reaction mixture was then poured over crushed ice, washed free of acids, neutralized with 10% KOH solution, again washed and dried over anhydrous $CaSO_4$. The crude material (624 grams) was subjected to a fractional distillation. The main portion of the mixture boiled between 100–234° C. Nine individual fractions were separated in this boiling range; each was qualitatively shown to contain combined fluorine as well as chlorine.

*Example II*

In a copper reaction flask equipped with a high speed stirrer, Dry Ice condenser, and gas sparger tube; 261 grams (1 mol) of hexachlorobutadiene were suspended in 780 grams anhydrous hydrogen fluoride by means of the stirrer. The reaction was cooled by means of a surrounding Dry Ice bath. From a weighed cylinder pure $ClF_3$ gas was forced below the surface of the suspension. The temperatures in the reaction zone were maintained between 11–15° C. When one mol of $ClF_3$ had been added, the passage of the $ClF_3$ was stopped. The resulting reaction product was poured over crushed ice, washed, neutralized with 10% KOH solution, washed again and dried over anhydrous $CaSO_4$. On fractional distillation, ten product cuts were obtained, boiling from 57° C. to 255° C. All cuts were qualitatively shown to contain combined fluorine as well as chlorine.

*Example III*

In the reaction apparatus described under Example I, 322 grams (2 mols) of tetrachloroethylene were suspended in 100 grams of hydrogen fluoride. 124 grams (1½ mols) of $ClF_3$ liquid (a 20% solution in hydrogen fluoride) was allowed to run slowly into the suspension. Reaction temperatures ranged between 16 to 35° C. On processing the resulting reaction mixture as in the previous examples, five product fractions were obtained boiling from 93° C. to 144° C. All fractions were shown qualitatively to contain combined fluorine as well as chlorine.

*Example IV*

Using a reaction apparatus similar to that described in Example II, 138 grams of pure $ClF_3$ gas were passed below the surface of 543 grams (3 mols) of trichlorobenzene suspended in 552 grams of anhydrous hydrogen fluoride. The temperatures in the reaction zone were maintained between 9 and 17° C. The product was poured over crushed ice to give a yellow solid. The crude product was dissolved in ether, washed, neutralized with 10% KOH, washed again and dried over anhydrous $CaSO_4$. After removal of the ether medium, a yellow solid material was obtained which was thermally unstable at elevated temperatures. This material was refluxed in 10% KOH solution for nine hours. A stable product, boiling between 75 and 200° C. at 6 to 8 mm. pressure, resulted from the treatment. The material was shown qualitatively to contain combined fluorine as well as chlorine.

*Example V*

92 grams of $ClF_3$, as a 20% solution in hydrogen fluoride, were added with stirring to 34 grams of kerosene suspended in an equal amount of hydrogen fluoride. A vigorous but not violent reaction was observed. The resulting reaction mixture after being washed free from acids was qualitatively analyzed and found to contain combined fluorine as well as chlorine.

*Example VI*

To a suspension of about 50 grams of ligroin in about 20 grams of hydrogen fluoride was added, with vigorous stirring, about 40 grams of $ClF_3$. The $ClF_3$ was added as a 20% solution of $ClF_3$ in hydrogen fluoride. The reaction was vigorous though not violent. The reaction product was a dark colored oily liquid substance which on working and subjecting to qualitative analysis was found to contain fluorine as well as chlorine.

*Example VII*

A reaction flask provided with a stirrer and cooled by ice was provided with 156 grams of benzene suspended in an equal amount of hydrogen fluoride. To this suspension 276 grams of $ClF_3$ were slowly added, while stirring, the $ClF_3$ being added in the form of a 21% solution of $ClF_3$ in hydrogen fluoride. The temperature of the flask content was kept at between 10 and 15° C. throughout the reaction. The resulting product was poured over ice, washed with water and then broken up into several fractions. These fractions on being subjected to qualitative analysis were found to contain fluorine as well as chlorine.

*Example VIII*

Using the same apparatus as that employed in Example I, 409 grams of $ClF_3$, as a 22% solution of $ClF_3$ in hydrogen fluoride, were added slowly, with stirring, to a hydrogen fluoride suspension of 292 grams of benzotrifluoride. The procedure of the reaction was substantially the same as that of Example I, reaction temperature being held below 20° C. The reaction procceded smoothly. The $ClF_3$ was added gradually over a period of several hours after which time the reaction was shut down and the reactant material poured over crushed ice. The product was then washed with water and on being qualitatively analyzed was found to contain fluorine and chlorine.

In place of chlorine trifluoride, one or more other halogen fluorides may be used in the organic fluorinations described in the above examples. Thus bromine pentafluoride has been found to take part in reactions such as those above described with approximately the same degree of reactivity as chlorine trifluoride. Bromine trifluoride and iodine pentafluoride similarly are useful in fluorinations such as those above described and have been found to react with somewhat less vigor than chlorine trifluoride. The other halogen fluorides, for example, the remaining halogen fluorides hereinabove specifically named, are similarly useful in fluorinations as described in the above examples.

Moreover, fluorinations may be carried out as described in the above examples, employing as reactants other organic compounds, both aliphatic (including alicyclic) and aromatic. Examples include the paraffins and other hydrocarbons, e.g. methane, ethane, propane, butane, pentane, hexane, the butenes, the pentenes, butadiene, isoprene, acetylene, the various petroleum fractions including gasoline, kerosene, etc.; cyclohexane, cyclohexene, pinene, benzene, toluene, the three xylenes, naphthalene, anthracene, ethyl benzene, the ethyl toluenes, other alkyl benzenes and naphthalenes; halogenated compounds such as nitrochlorobenzene, monochlorobenzene, the dichlorobenzenes, the trichlorobenzenes, the tetrachlorobenzenes, pentachlorobenzene, hexachlorobenzene, monobromobenzene, other bromobenzenes, the iodobenzenes, halogenated naphthalenes; halogenated aliphatic hydrocarbons such as ethyl chloride, ethylenedichloride, trichloroethane, tetrachloroethane, hexachloroethane, ethylene dibromide, ethylidene dibromide, ethylidene dichloride, trichloroethylene, tetrachloroethylene, hexachlorocyclohexane; other chlorinated compounds such as the halogen substituted phenoxyacetic acids, phenoxypropionic acids and the like; 1,1,1-trichloro-2,2-bis (p-chlorophenyl) ethane, its analogs, isomers, and homologs, including fluorine analogs, less highly halogenated analogs, etc.; the chlorinated thiophenes including monochlorothiophene, the dichlorothiophenes, the trichlorothiophenes, tetrachlorothiophene, the hexachloro derivative of thiophene and the octachloro derivative of thiophene; and organic compounds in general including, as examples, acetic, benzoic and other acids, maleic and phthalic anhydrides and other anhydrides, pyridine, quinoline, thiophene, aniline, azobenzene, benzonitrile, indigo, benzene sulfonic acid, diphenyl sulfide, ethyl and other alcohols, esters, ethers, phenol acetone, methyl ethyl ketone, benzoquinone, heterocyclics in general, naturally occurring products such as rosin, shellac, vegetable and mineral oils, the terpenes, fats, waxes, carbohydrates, proteins, gums, resins, their derivatives and synthetic analogs. It is understood that for the fluorination of each such compound the concentration of the halogen fluoride in the hydrogen fluoride (more fully discussed below) and the temperature are adjusted to obtain just the desired vigor and degree of reaction.

In carrying out the invention, the concentration of $ClF_3$ or other halogen fluoride in hydrogen fluoride should be varied so as to maintain a relatively rapid though non-violent reaction. The necessary amount of halogen fluoride to obtain the desired fluorinated reaction product should first be calculated. This calculated amount of halogen fluoride should then be dissolved in anhydrous hydrogen fluoride, the amount of hydrogen fluoride used being dependent on the rate of reaction desired. If the reaction is found to progress too rapidly, more hydrogen fluoride should be used. If the reaction proceeds too slowly, the quantity of hydrogen fluoride used should be reduced. It can thus be seen that by varying the concentration of halogen fluoride in anhydrous hydrogen fluoride a wide range of control is permitted for carrying out fluorination reactions with organic materials. Any suitable method may be used in preparing the homogeneous mixture of a halogen fluoride and hydrogen fluoride, it being understood that the claims are not limited to the particular manner of preparing such mixtures or solutions. Thus, for example, the halogen fluoride-hydrogen fluoride composition of our invention may be formed in situ, i.e. the organic material to be fluorinated may be suspended in hydrogen fluoride and the halogen fluoride compound, either in its pure form or diluted with hydrogen fluoride, added either as a gas or liquid, to the surrounding hydrogen fluoride. Or the halogen fluoride and hydrogen fluoride may be first mixed in the desired proportions and then added to the organic material or the organic material added to the homogeneous mixture of halogen fluoride and hydrogen fluoride. Solutions of halogen fluoride in hydrogen fluoride, containing from 10% to 90% by weight halogen fluoride, more usually from 10% to 50% halogen fluoride, we have found to be particularly desirable fluorinating compositions of quite general applicability; but compositions containing less than 10% halogen fluoride, e.g. ranging down to 5%, or down to 1%, or even down to 0.5% halogen fluoride, may be quite advantageous for particular reactions. The appended claims are intended to cover all compositions in which such a mixture of halogen fluoride and hydrogen fluoride makes up at least a part of the composition. Other materials may also be present; this includes materials relatively inert towards the halogen fluoride, e.g. chlorine, other halogens, hydrogen chloride, oxygen fluorides, carbon tetrafluoride, sulfur hexafluoride, and other fluorides, and also includes, of course, the organic reactants and products, and all such compositions are intended to be claimed so long as the composition includes a mixture of a halogen fluoride and hydrogen fluoride or equivalent agent inert towards the halogen fluorides, as described.

In most instances it is desirable to carry out the reactions in the liquid phase, the temperatures usually being somewhat below 20° C. However, the invention can be successfully practiced in the vapor phase when higher temperatures of reaction are desired. In such cases the solution of halogen fluoride in hydrogen fluoride can be made up in the liquid phase and then heated to the desired temperature for the vapor phase reaction or the calculated amounts of halogen fluoride and hydrogen fluoride can be mixed in the vapor phase and then passed into the reaction vessel.

Throughout the description of our invention the fluorinating agent $ClF_3$ has been specifically referred to since we have found this compound to be the most active of the halogen fluorides with respect to reactions with organic materials. However, what has been said with respect to $ClF_3$ to a somewhat lesser degree may also be said with respect to the other halogen fluorides particularly those containing the maximum amount of fluorine in combination with the other halogen since all of these compounds react somewhat violently with organic materials and dissolve readily in hydrogen fluoride, the resulting solution showing a marked decrease in the rate or violence of reaction as compared to the reaction resulting from the use of the halogen fluoride alone.

In describing our invention, several examples have been given in order to better understand the operation thereof. These should be used as illustrations only and are not intended in any way to limit the scope of the invention.

The present application is a division of application Serial No. 48,748 filed September 10, 1948, which application issued into Patent No. 2,702,306 on February 15, 1955.

We claim:

1. As a new composition of matter a homogeneous liquid mixture of a halogen fluoride, other than a fluorine fluoride, and hydrogen fluoride, the amounts of said halogen fluoride and hydrogen fluoride in said homogeneous mixture being respectively not less than 0.5% halogen fluoride and not less than 10% hydrogen fluoride.

2. A fluorinating agent for organic materials consisting essentially of a homogeneous liquid mixture of a halogen fluoride, other than a fluorine fluoride, and hydrogen fluoride, the amounts of said halogen fluoride and said hydrogen fluoride contained in said mixtures being respectively not less than 10% halogen fluoride and 50% hydrogen fluoride by weight.

3. The composition of claim 1 wherein the halogen fluoride is chlorine trifluoride.

4. The composition of claim 1 wherein the halogen fluoride is bromine pentafluoride.

5. The composition of claim 2 wherein the halogen fluoride is chlorine trifluoride.

6. The composition of claim 2 wherein the halogen fluoride is bromine pentafluoride.

References Cited in the file of this patent

UNITED STATES PATENTS

| | | |
|---|---|---|
| 2,013,030 | Calcott et al. | Sept. 3, 1935 |
| 2,318,684 | Gaylor et al. | May 11, 1943 |
| 2,493,008 | McBee et al. | Jan. 3, 1950 |
| 2,574,619 | Cady | Nov. 13, 1951 |
| 2,702,306 | Gall et al. | Feb. 15, 1955 |

OTHER REFERENCES

Neumark: Item 22, Misc. Chemicals OTS, P.B. 16838 (August 20–22, 1945).

Booth et al.: "Chemical Reviews," vol. 41, p. 424 (1947).

Porter: Chem. Eng., vol. 55, April–June (1948), No. 4, pp. 102–104.